United States Patent
Kim et al.

(10) Patent No.: US 8,229,235 B2
(45) Date of Patent: Jul. 24, 2012

(54) HYBRID IMAGE DATA PROCESSING SYSTEM AND METHOD

(75) Inventors: Jung-Rae Kim, Seongnam-si (KR);
Jin-Pyo Park, Seongnam-si (KR);
Jae-Hong Park, Seongnam-si (KR);
Young-Jun Kwon, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 996 days.

(21) Appl. No.: 11/543,116

(22) Filed: Oct. 5, 2006

(65) Prior Publication Data
US 2007/0098283 A1 May 3, 2007

(30) Foreign Application Priority Data
Oct. 6, 2005 (KR) .......... 10-2005-0093902

(51) Int. Cl.
*G06K 9/36* (2006.01)
(52) U.S. Cl. .......... 382/239; 382/234
(58) Field of Classification Search .......... 382/239
See application file for complete search history.

(56) References Cited

U.S. PATENT DOCUMENTS

| 5,801,841 | A | 9/1998 | Suzuki | |
|---|---|---|---|---|
| 6,427,025 | B1 | 7/2002 | Shimomura et al. | |
| 6,583,887 | B1 * | 6/2003 | Clouthier et al. | 358/1.15 |
| 6,731,814 | B2 | 5/2004 | Zeck et al. | |
| 2002/0097917 | A1 | 7/2002 | Nelson et al. | |
| 2002/0118748 | A1 * | 8/2002 | Inomata et al. | 375/240.04 |
| 2004/0161156 | A1 * | 8/2004 | Matsubara | 382/232 |
| 2006/0050975 | A1 * | 3/2006 | Ito et al. | 382/232 |
| 2008/0112691 | A1 * | 5/2008 | Kobayashi | 386/124 |

FOREIGN PATENT DOCUMENTS

| CN | 1158050 | 8/1997 |
|---|---|---|
| EP | 0 782 341 | 7/1997 |
| JP | 07-222152 | 8/1995 |
| JP | 10-215455 | 8/1998 |
| JP | 2002-034043 | 1/2002 |
| JP | 2004-007475 | 1/2004 |
| KR | 10-2001-0017322 A | 3/2001 |

OTHER PUBLICATIONS

Chinese Office Action dated Dec. 18, 2009 and English translation thereof.
Preliminary Notice of First Office Action issued by the Taiwanese Patent Office on Sep. 14, 2009.

* cited by examiner

*Primary Examiner* — Bhavesh Mehta
*Assistant Examiner* — Nirav G Patel
(74) *Attorney, Agent, or Firm* — Harness, Dickey & Pierce, P.L.C.

(57) ABSTRACT

An image data compression system, for compressing a frame represented as a plurality of blocks, can include: a lossless compression unit to receive the plurality of blocks and to perform lossless compression thereon resulting in a first code; a lossy compression unit to receive the plurality of blocks and to perform lossy compression thereon resulting in a second code; and a code selection circuit to selectively output one of the first and second codes based upon a figure of merit evaluated for at least one of the first and second codes.

29 Claims, 8 Drawing Sheets

HYBRID IMAGE DATA PROCESSING SYSTEM AND METHOD

PRIORITY STATEMENT

This application claims the benefit of Korean Patent Application No. 10-2005-0093902, filed on Oct. 6, 2005, in the Korean Intellectual Property Office, the disclosure of which is incorporated herein in its entirety by reference.

BACKGROUND OF THE INVENTION

1. Field of the Invention

The present invention relates to an image data processing system and method.

2. Description of the Related Art

In codec standards for image data, such as moving picture experts group (MPEG)-2, MPEG-4, and H.264, an input image is divided into blocks having a predetermined pixel structure, e.g., 8×8 or 16×16 pixels, and discrete cosine transform (DCT) and quantization are performed on the divided image data for compression. The quantized image data is further compressed through entropy coding.

In general, image data are processed by an intra-compression method or an inter-compression method. The intra-compression method performs compression only using information within a single image frame. In image data, adjacent pixels are likely to have similar pixel values. The intra-compression uses such a feature to reduce the amount of data.

The inter-compression method encodes an image based on differences between pixel values of pixels between successive frames. Temporally successive images mainly include a motion of a person or an object only in the center of a screen without a change in the background of the person or the object, and temporal redundancy can be removed using this feature. In other words, a portion of a current frame, which is not changed from or is almost similar to a preceding or following frame, refers to the preceding or following frame without being encoded, thereby largely reducing the amount of compressed data.

Since the inter-compression method refers to a preceding or following image to generate a current image, the preceding or following image should be previously stored. A position to be referred to in the preceding or following image may be changed by the current image. Thus, the storage format of the preceding or following image should be such that it can be randomly accessed.

Figure 1:
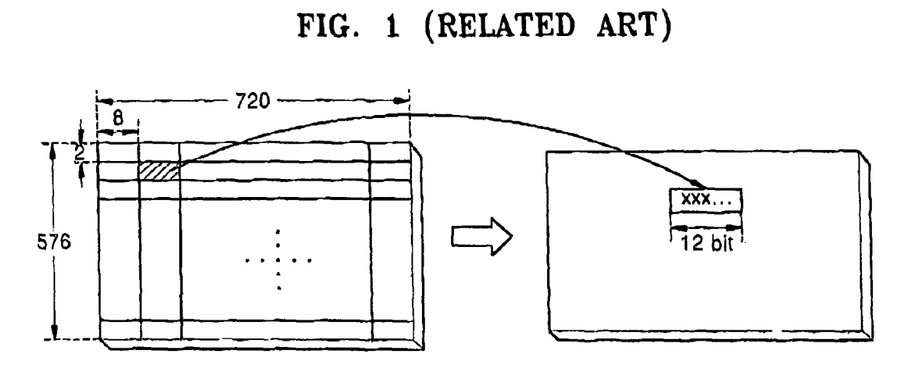
FIG. 1 is a view for explaining compression of a frame in units of a block according to the Related Art.

According to a block-based compression method that divides a frame into a plurality of blocks, the whole frame is divided into several blocks of a predetermined size and the divided blocks are independently compressed. FIG. 1 is a view for explaining compression of a frame in units of a block according to the Related Art.

As illustrated in FIG. 1, a frame is divided into blocks, each having 8*2 pixels, and each of the blocks is compressed. Each compressed block is stored in a designated buffer space of a memory unit (frame buffer) as a code. In FIG. 1, the designated buffer space for storing a single block is composed of 12 bits. U.S. Pat. No. 6,693,961 discloses a data processing technique for dividing a frame into a plurality of blocks and compressing the blocks.

The size of a designated buffer space occupied by a single block is determined according to a target compression rate and the designated buffer space is exclusively assigned to each block, thereby automatically determining the start position of each block. Since the start position of each block can be calculated through a simple operation, a plurality of blocks can be randomly accessed in hardware.

Various image data compression methods have been developed, but they do not usually support random accesses in a frame or are not suitable for actual application due to severe degradation in image quality even when supporting the random accesses. In other words, efficient image data compression should primarily aim at preventing degradation in image quality. However, the size of a compressed image and a memory capacity for storing the compressed image should also be considered, because they have a significant influence upon the cost of an apparatus for reproducing image data.

For example, to reproduce compressed data according to the compression standards stated above, a memory device having large capacity is required. A memory storage space of about 1.2 Mbytes is required to decode a PAL format used in common broadcasting or digital versatile discs (DVDs). However, in recently released decoding equipment, the entire system shares a 2-Mbyte memory device. As a result, 1.2 Mbytes occupy a large space of the 2-Mbyte memory device. This means that memory device should be used through efficient compression of image data. However, as mentioned above, it is a problem to handle image quality degradation or an increase in the size of compressed image data. In particular, in the block-based compression method, a compression failure occurs when the size of compressed image data exceeds the size of a compression space for each block.

SUMMARY

One or more embodiments of the present invention provide a hybrid image data processing system and method, in which lossy compression and lossless compression are selectively used to efficiently compress image data.

An embodiment of the present invention provides an image data compression system for compressing a frame having a plurality of blocks in units of each of the blocks. The image data compression system includes a lossless compression unit to receive the plurality of blocks and to perform lossless compression thereon resulting in a first code; a lossy compression unit to receive the plurality of blocks and to perform lossy compression thereon resulting in a second code; and a code selection circuit to selectively output one of the first and second codes based upon a figure of merit evaluated for at least one of the first and second codes. An embodiment of the present invention provides a method corresponding to such system.

Additional features and advantages of the present invention will be more fully apparent from the following detailed description of example embodiments, the accompanying drawings and the associated claims.

BRIEF DESCRIPTION OF THE DRAWINGS

The above and other features and advantages of the present invention will become more apparent by describing in detail example with reference to the attached drawings in which.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, example embodiments of the present invention will be described in detail with reference to the accompanying drawings. In the drawings, the same or similar elements are denoted by the same reference numerals even though they are depicted in different drawings.

Figure 2:
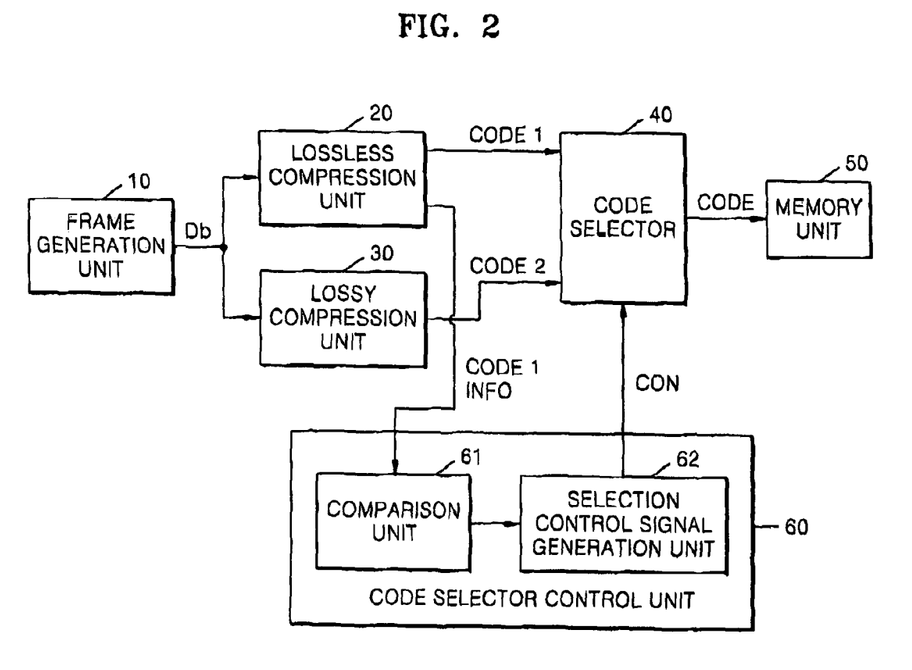
FIG. 2 is a block diagram of an image data compression system according to an example embodiment of the present invention.

FIG. 2 is a block diagram of an image data compression system according to an example embodiment of the present invention.

In FIG. 2, the image data compression system compresses a frame that includes a plurality of blocks in units of a block. The image data compression system includes a lossless compression unit 20 that receives image data Db input in units of a block from a frame generation unit 10 and performs lossless compression on the received image data Db and a lossy compression unit 30 that receives the image data Db and performs lossy compression on the received image data Db. While the image data Db is depicted in FIG. 2 as being input from the frame generation unit 10, it may be input from a general frame generator. The system further includes a code selection circuit 40 that itself can include a code selector 40 and a code selector control unit 60.

The lossless compression unit 20 performs lossless compression on the image data Db, generates a first code CODE 1 and produces first code information CODE 1 INFO indicative of the size of the first code CODE 1. Here, size can be described as a figure of merit for which the first code CODE 1 has been evaluated. For lossless compression of the image data Db, e.g., lossless bit plane coding may be used.

The lossy compression unit 30 performs lossy compression on some bits of the image data Db and generates a second code CODE 2. For lossy compression of the image data Db, e.g., a quantization-based technique or an error feedback rounding technique may be used. The size of the second code CODE 2 output by the lossy compression unit 30 is assumed to be less than the size of a designated buffer space at all times.

The code selector 40 receives the first code CODE 1 and the second code CODE 2 and outputs one of them to a memory unit 50. In particular, the code selector 40 outputs the first code CODE 1 when the size of the first code CODE 1 is less than or equal to the size of a designated buffer space for storing the first code CODE 1, and the code selector 40 outputs the second code CODE 2 when the size of the first code CODE 1 is greater than the size of the designated buffer space in the memory unit 50.

The image data compression system of FIG. 2 may further include a code selector control unit 60 for controlling the code selector 40 to operate in a manner described above. The code selector control unit 60 may include a comparison unit 61 and a selection control signal generation unit 62.

The code selector control unit 60 compares the size of the first code CODE 1 and the size of the designated buffer space and outputs a selection control signal CON to the code selector 40 according to a comparison result. The memory unit 50 receives and stores image data compressed in units of a block. The size of a designated buffer space in the memory unit 50 for storing image data of each block is, e.g., fixed.

The comparison unit 61, which includes information about the size of a designated buffer space formed in the memory unit 50, receives first code information CODE 1 INFO from the lossless compression unit 20, compares the size of the first code CODE 1 and the size of the designated buffer space, and outputs a comparison signal to the selection control signal generation unit 62.

The selection control signal generation unit 62 receives the comparison signal from the comparison unit 61 and generates the selection control signal CON for controlling the code selector 40. The output selection control signals CON have opposite levels for a case when the size of the first code CODE 1 is less than or equal to the size of the designated buffer space and for a case when the size of the first code CODE 1 is greater than the size of the designated buffer space. Thus, the code selector 40 can output one of the first code CODE 1 and the second code CODE 2.

Hereinafter, the detailed operation of the image data compression system will be described with reference to FIGS. 3A through 5.

Figure 3A:
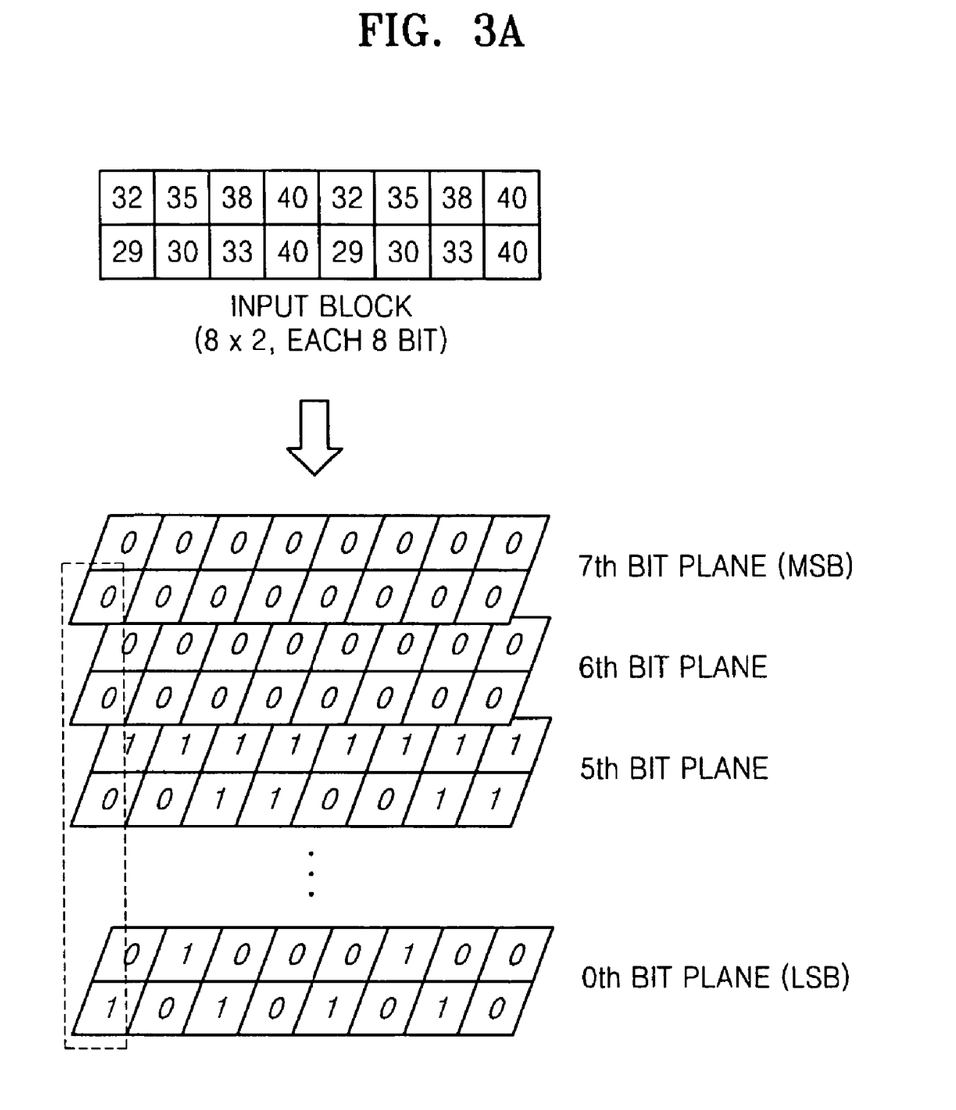
FIGS. 3A and 3B are views for explaining data compression performed by a lossless compression unit according to an example embodiment of the present invention.
Figure 3B:
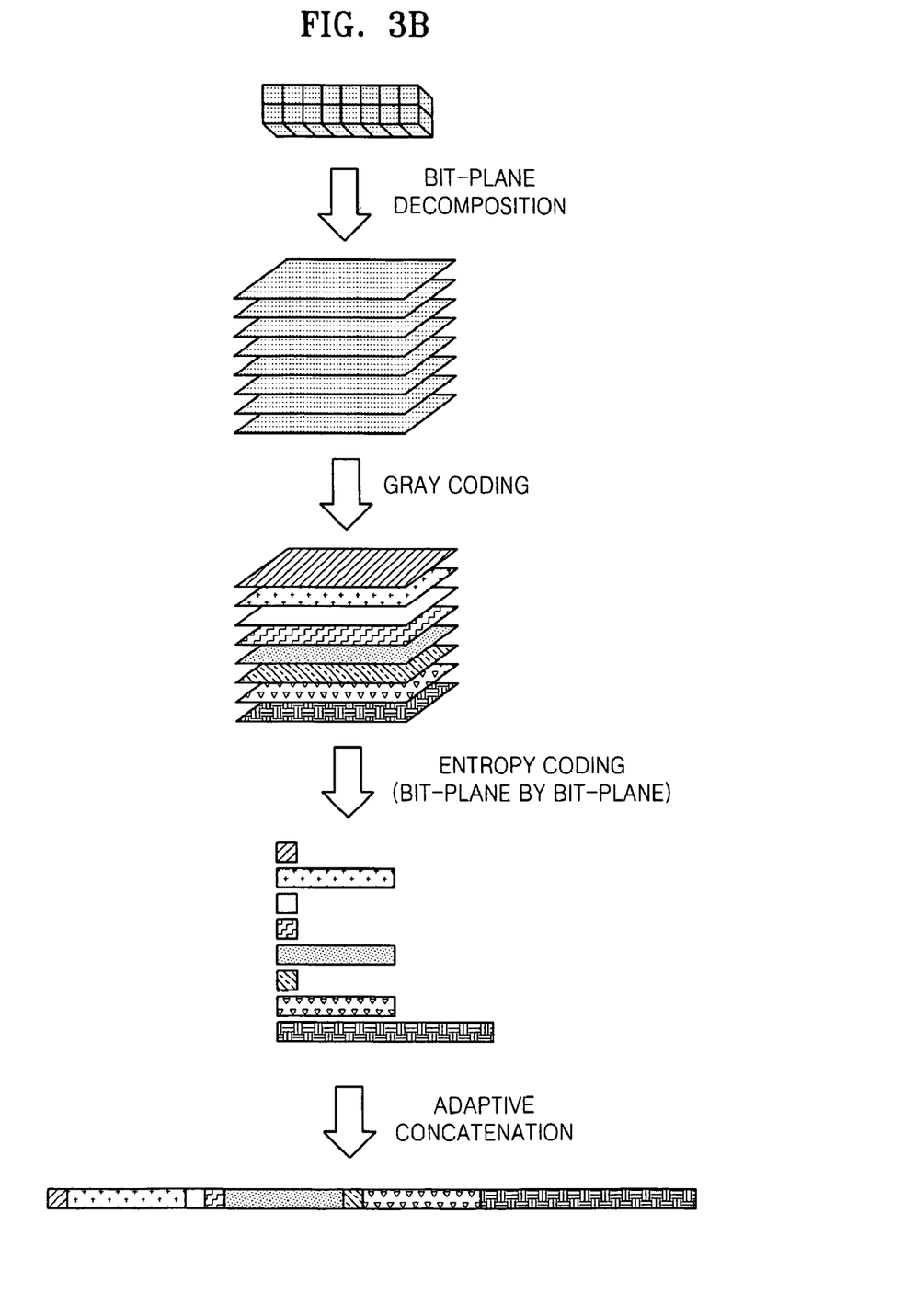

FIGS. 3A and 3B are views for explaining data compression performed by a lossless compression unit according to an example embodiment of the present invention. Although lossless data compression using bit plane coding is illustrated in FIG. 3A, another lossless data compression method may be used.

The image data Db is input to the lossless compression unit 20 from the frame generation unit 10 in units of a block. In FIGS. 3A and 3B, a block includes, e.g., 8*2 pixels and each of the pixels is represented by 8 bits.

Binary data corresponding to, e.g., gray scales (256 gray scales) of each pixel is arranged vertically in a direction from a most significant bit (MSB) to a least significant bit (LSB) as marked with dotted lines. Thus, the MSB of each of the 16 pixels is positioned at the top and a bit plane is formed of 16 MSBs. A next lower bit plane is formed of next significant bits of the 16 pixels. A bit plane composed of LSBs of the 16 pixels is positioned at the bottom. The bit plane composed of LSBs is defined as a $0^{th}$ bit plane and the bit plane composed of MSBs is defined as a $7^{th}$ bit plane.

Gray coding is performed on the formed bit planes. Gray codes have the property that, for sequential values are to be coded (e.g., an $N^{th}$ value and an $(N+1)^{th}$ value, the resulting Gray codes differ only by one bit. When the gray scale of each pixel is changed by one level due to gray coding, the binary data of each pixel has a change in a single bit. In general, since the gradations of adjacent pixels are similar, the binary data of the adjacent pixels have almost the same bit sequence.

Thus, the formed bit planes usually have the same bit sequence of all 0s or 1s. In other words, correlation between data bits of the pixels increases through gray coding. Often, many if not most of the bit planes have a data pattern of all 0s or 1s.

In FIG. 3B, entropy coding with respect to the formed bit planes is illustrated. As illustrated in FIG. 3B, bit planes are formed for pixels of a block, are gray-coded, and then entropy-coded. The entropy coding assigns a short code to a frequent bit plane pattern and a long code to a rare bit plane pattern. The size of image data is statistically reduced according to code assignment of the entropy coding.

Figure 4:
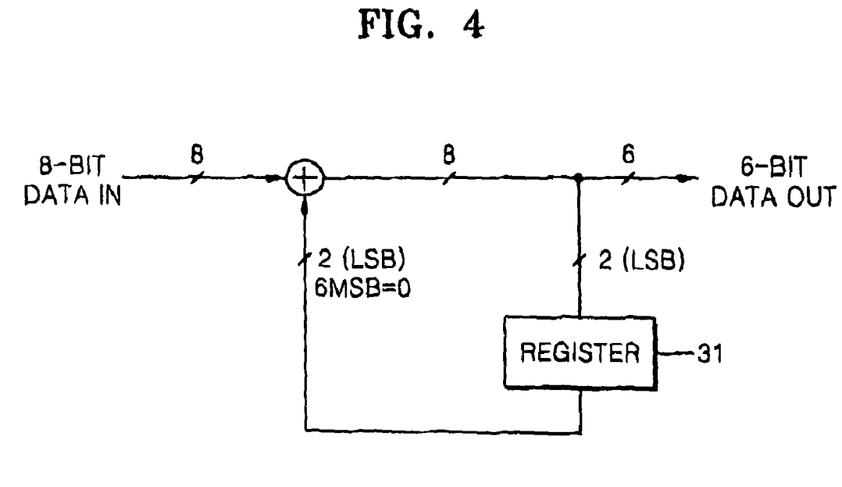
FIG. 4 is a view for explaining data compression performed by a lossy compression unit according to an example embodiment of the present invention.

FIG. 4 is a view for explaining data compression performed by the lossy compression unit 30 according to an example embodiment of the present invention. Although lossy data compression using error feedback rounding is illustrated in FIG. 4, but another lossy data compression method may be used.

As illustrated in FIG. 4, once 8-bit image data of each pixel is input, lower 2-bit data of the 8-bit image data is removed. The removed data is temporarily stored in a register 31 as an 8-bit word whose six most significant bits are zero (6NSB=0). The remaining 6-bits are output as a 6-bit word.

Operations described above are repetitively performed on image data of a plurality of pixels of a block. Lower 2-bit image data removed during the operations are stored in the register 31 and subsequently undergo an addition process. If a result of the addition upon the present image data exceeds a reference value, then 1 bit is added to next input image data. Some bits of the present image data (again) are removed via the use of lossy compression. The image data gradually changes by alleviating a stepwise change of the image data, thereby improving the quality of a decoded frame.

As described with reference to FIGS. 3A, 3B, and 4, the image data Db is input to the lossless compression unit 20 and the lossy compression unit 30 of FIG. 2 and is compressed into the first code CODE 1 and the second code CODE 2. The image data Db may be simultaneously input to the lossless compression unit 20 and the lossy compression unit 30. Alternatively, the image data Db may be compressed into the first code CODE 1 by the lossless compression unit 20 and the image data Db may be input to the lossy compression unit 30 when the size of the first code CODE 1 is determined to exceed the size of a designated buffer space.

Figure 5:
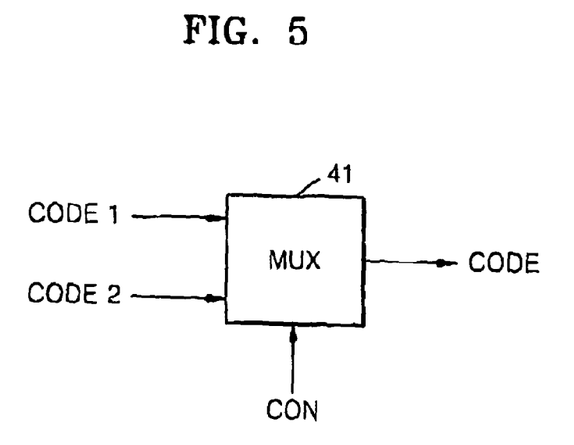
FIG. 5 illustrates in more detail (according to an example embodiment of the present invention) a code selector of FIG. 2.

FIG. 5 illustrates (in more detail, according to an example embodiment of the present invention) the code selector 40 of FIG. 2. The code selector 40 receives the first code CODE 1 and the second code CODE 2 and outputs one of them. In this case, the code selector 40 may use a 2:1 multiplexer (MUX) 41 that receives two signals and outputs one of them.

The multiplexer 41 may include at least one switch (not shown) for controlling the output of the first code CODE 1 and the second code CODE 2. A switch for controlling the output of the first code CODE 1 and a switch for controlling the output of the second code CODE 2 are switched by control signals having opposite levels. The selection control signal CON generated (again) by after comparison between the first code CODE 1 and the size of a designated buffer space is input to the multiplexer 41. Thus, the multiplexer 41 outputs one of the first code CODE 1 and the second code CODE 2 to the memory unit 50.

The image data compression system according to an embodiment of the present invention can be described as using a hybrid type of compression which is hybrid in a sense that lossless compression or lossy compression is selected on an adaptive basis, e.g., on a block-by-block basis, according to a figure of merit applied to the performance of at least one of the lossless compression and the lossy compression. As such, information about a compression type can be included in a compressed code to facilitate decoding the compressed code. To this end, a code generated by the lossless compression unit 20 or the lossy compression unit 30, e.g., may include a flag bit that may be 1 bit.

Figure 6:
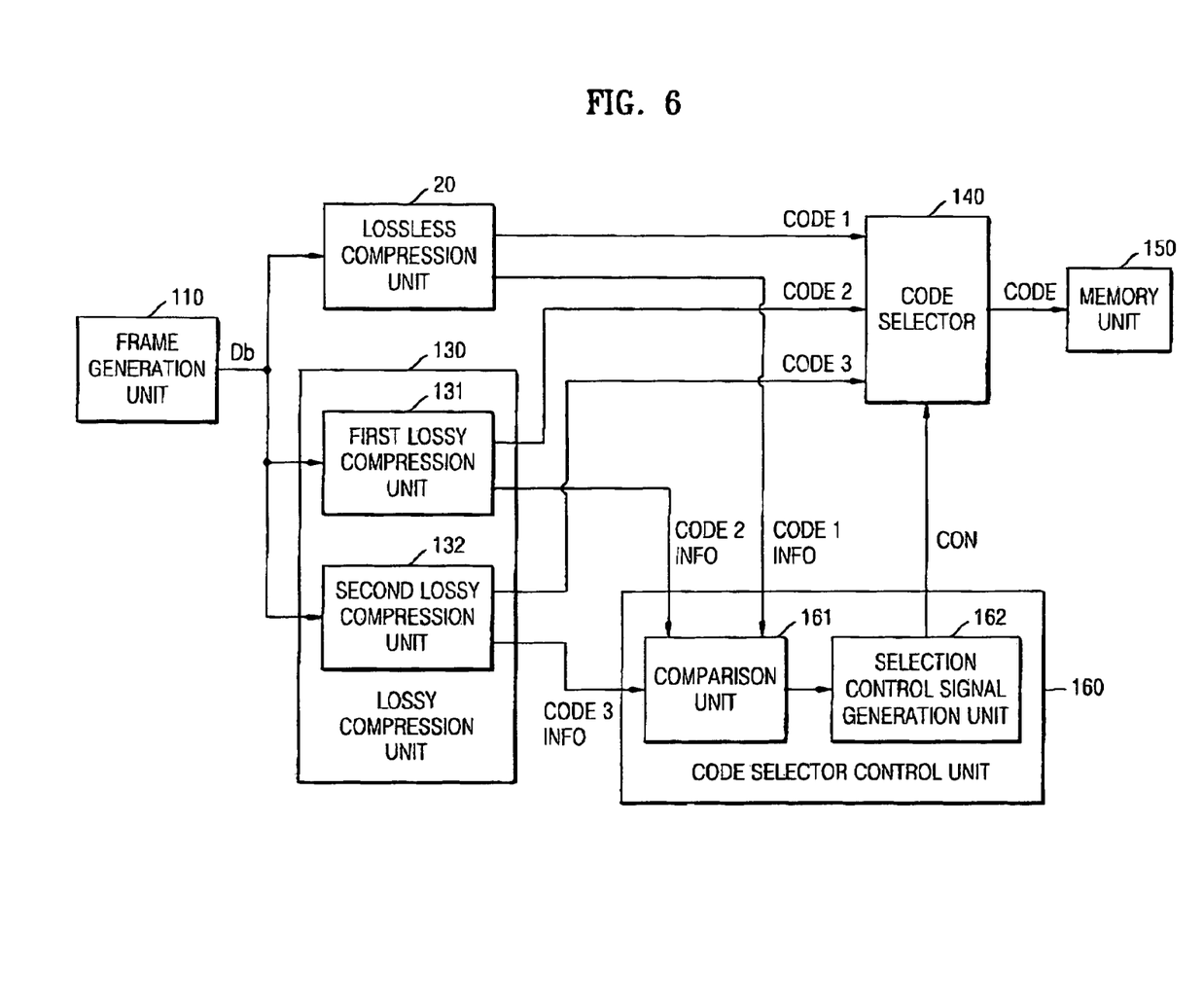
FIG. 6 is a block diagram of an image data compression system according to an example embodiment of the present invention.

FIG. 6 is a block diagram of an image data compression system according to an example embodiment of the present invention. Components corresponding to those in FIG. 2 will not be described in detail.

As illustrated in FIG. 6, the image data compression system includes a lossless compression unit 120 that receives image data Db that input from a frame generation unit 110 in units of a block and performs lossless compression on the received image data Db and a lossy compression unit 130 that receives the image data Db and performs lossy compression on the received image data Db. The system also includes a code selection circuit that itself can include a code selector 140 and a code selector control unit 160.

The image data compression system further includes a code selector 140 that receives a first code CODE 1 output from the lossless compression unit 120 and a plurality of codes CODE 2 and CODE 3 output from the lossy compression unit 130 and outputs one of them to a memory unit 150. Although two codes are generated by the lossy compression unit 130 in FIG. 6, a greater number of codes may be generated.

In particular, a code output by the code selector 140 has a size smaller than the size of its designated buffer space in the memory 150. Moreover, e.g., the selected code can have, e.g., the smallest loss rate among those of the generated lossy codes whose sizes are smaller than the size of the designated buffer space. The first code CODE 1 generated by lossless compression may be defined as a code having a loss rate of 0%.

The image data compression system may further include a code selector control unit 160 for controlling the code selector 140 to operate in a manner described above. The code selector control unit 160 may include a comparison unit 161 and a selection control signal generation unit 162.

In FIG. 6, the lossy compression unit 130 receives image data Db input in units of a block, performs lossy compression on the received image data Db, and includes a plurality of lossy compressors to compress the image data Db with a reduced if not minimized loss rate. In FIG. 6, the lossy compression unit 130 includes a first lossy compressor 131 that performs lossy compression on the image data Db at a first loss rate and generates a second code CODE 2 and a second lossy compressor 132 that performs lossy compression on the image data Db at a second loss rate using a type of lossy compression that is different from that used in the first lossy compressor 131 and generates a third code CODE 3.

First lossy compressor 131 and second lossy compressor 132 also produce second information CODE 2 INFO and third code information CODE 3 INFO indicative of the loss rate of the second code CODE 2 and the third code CODE 3, respectively. Here, loss rate can be described as another figure of merit for which the second and third codes CODE 2 and CODE 3 have been evaluated, respectively. The second code information CODE 2 INFO also is indicative of the size of the second code CODE 2.

Code information CODE 1 INFO through CODE 3 INFO of the first code CODE 1 through the third code CODE 3 are input to the comparison unit 161 of the code selector control unit 160. The comparison unit 161 compares the size of the first code CODE 1 and the second code CODE 2 with the size of the designated buffer space and compares the loss rate of the second code CODE 2 with the loss rate of the third code CODE 3 to output a comparison signal to the selection control signal generation unit 162. The selection control signal generation unit 162 receives the comparison signal and generates a selection control signal CON for controlling the code selector 140.

Figure 7:
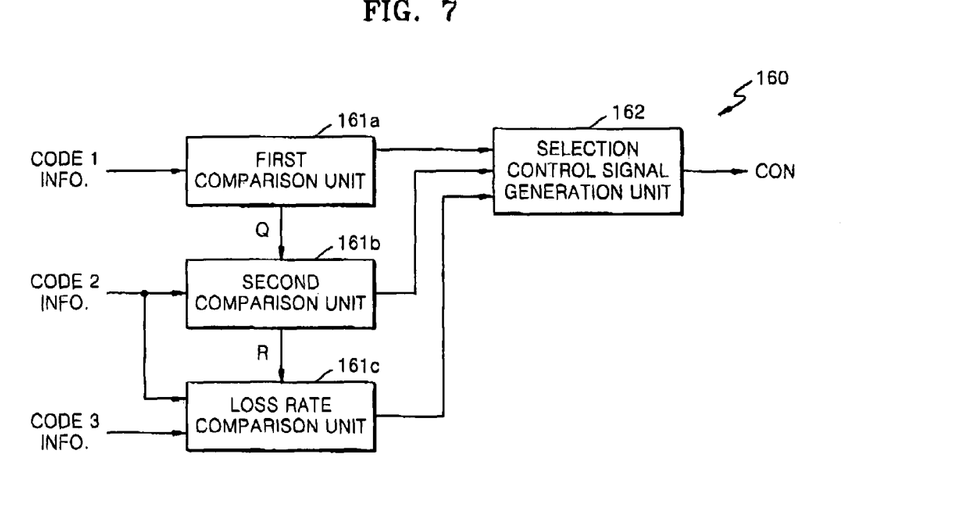
FIG. 7 is a more detailed block diagram of a code selector control unit of FIG. 6, according to an example embodiment of the present invention.

FIG. 7 is a more detailed block diagram (according to an example embodiment of the present invention) of the code selector control unit 160 of FIG. 6.

Referring to FIG. 7, the code selector control unit 160 includes a first comparison unit 161*a*, a second comparison unit 161*b*, a loss rate comparison unit 161*c*, and a selection control signal generation unit 162. The first comparison unit 161*a* compares the size of the first code CODE 1 and the size of the designated buffer space. When the size of the first code CODE 1 is less than or equal to the size of the designated buffer space, the first comparison unit 161*a* outputs a correspondingly indicative signal to the selection control signal generation unit 162 and a control signal Q to the second comparison unit 161*b* to disable the second comparison unit 161*b*.

When the size of the first code CODE 1 is greater than the size of the designated buffer space, the second comparison unit 161*b* is enabled by the control signal Q. Then, the second comparison unit 161*b* compares the size of the second code CODE 2 and the size of a designated buffer space for storing the second code CODE 2.

If the size of the second code CODE 2 is greater than the size of the designated buffer space, then the second comparison unit 161*b* outputs a correspondingly indicative signal to the selection control signal generation unit 162. In this case, the selection control signal generation unit 162 generates the selection control signal CON for controlling the code selector 140 to select and output the third code CODE 3.

If the size of the second code CODE 2 is less than or equal to the size of the designated buffer space, then the second comparison unit 161*b* generates a control signal R that is output to the loss rate comparison unit 161*c* to enable the loss rate comparison unit 161*c*.

When the loss rate comparison unit 161*c* is enabled, it compares the loss rate of the second code CODE 2 and the loss rate of the third code CODE 3 and outputs a comparison signal for selecting the code having the smaller loss rate to the selection control signal generation unit 162. The selection control signal generation unit 162 receives the comparison signal and outputs the corresponding selection control signal CON for controlling the code selector 140.

Through the operations as described above, when the size of the first code CODE 1 is less than or equal to the designated buffer space for storing the first code CODE 1, the code selector 140 selects the first code CODE 1 under the control of the selection control signal CON and outputs the first code CODE 1 to the memory unit 150. When the size of the first code CODE 1 is greater than the size of the designated buffer space, the size of the second code CODE 2 is less than or equal to the designated buffer space for storing the second code CODE 2, and the loss rate of the second code CODE 2 is smaller than that of the third code CODE 3, the code selector 140 selects the second code CODE 2 and outputs the second code CODE 2 to the memory unit 150. In the remaining cases, the code selector 140 selects the third code CODE 3 and outputs the third code CODE 3 to the memory unit 150.

In FIG. 7, after the size of the first code CODE 1 and the size of the designated buffer space are compared, the second comparison unit 161*b* is enabled when the size of the first code CODE 1 is greater than the size of the designated buffer space. However, the present invention is not limited to FIG. 7; e.g., all of the first comparison unit 161*a*, the second comparison unit 161*b*, and the loss rate comparison unit 161*c* may simultaneously perform comparison to output a comparison signal having at least three different levels to the selection control signal generation unit 162, thereby performing the operation as in FIG. 7.

To facilitate the decoding of a compressed code output from the code selector 140, information about a compression type can be included in the compressed code. To this end, e.g., a code generated by the lossless compression unit 120 or the lossy compression unit 130 may include a flag bit.

The code selector 140 receives the first code CODE 1 through the third code CODE 3 and selectively outputs one of them according to the selection control signal CON. To this end, e.g., the code selector 140 may use a 3:1 multiplexer that receives three signals and outputs one of them.

Figure 8:
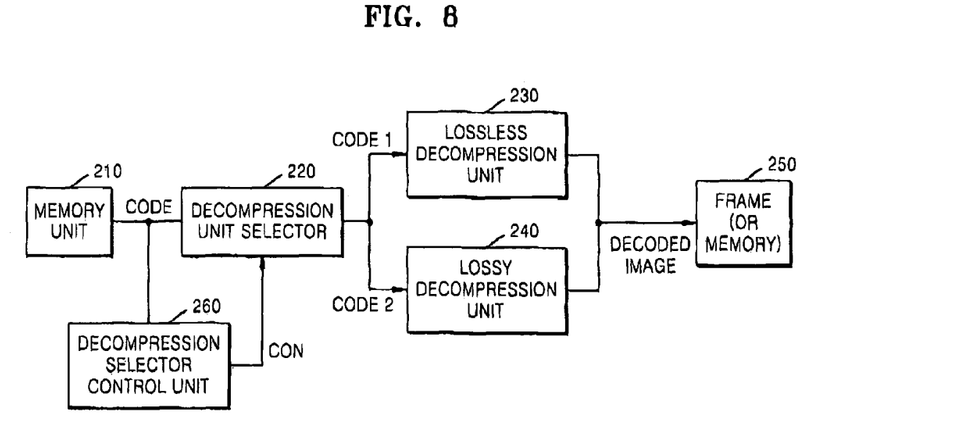
FIG. 8 is a block diagram of an image data reconstruction system according to an example embodiment of the present invention.

To reconstruct image data by decoding the compressed code, an image data reconstruction system performs decoding in a reverse order to compression. FIG. 8 is a block diagram of an image data reconstruction system according to an example embodiment of the present invention.

Referring to FIG. 8, the image data reconstruction system includes a decompression unit selector 220, a lossless decompression unit 230, and a lossy decompression unit 240. The system further may include a decompression unit selector control unit 260 for controlling the decompression unit selector 220.

The decompression unit selector 220 receives a code generated through compression of a frame (e.g., represented as a plurality of blocks) from a memory unit 210. The code may be a first code CODE 1 generated through lossless compression of a block of the frame or a second code CODE 2 generated through lossy compression of the block. Lossless compression of image data to generate the first code CODE 1 may use, e.g., bit plane coding. Lossy compression of image data to generate the second code CODE 2 may use, e.g., lossy bit plane coding or error feedback rounding.

The compression unit selector 220 receives one of the first code CODE 1 and the second code CODE 2. When the input code is the first code CODE 1, the compression unit selector 220 outputs the first code CODE 1 to the lossless decompression unit 230. When the input code is the second code CODE 2, the compression unit selector 220 outputs the second code CODE 2 to the lossy decompression unit 240.

The input code generated according to this embodiment of the present invention may include a flag bit for indicating whether the input code is generated through lossy compression or lossless compression.

The decompression unit selector control unit 260 that may be included in the image data reconstruction system receives the code, checks the flag bit included in the input code, and outputs a selection control signal CON according to the flag bit to the decompression unit selector 220. The decompression selector 220 outputs the input code to one of the lossless decompression unit 230 and the lossy decompression unit 240 according to the selection control signal CON. A frame 350 is reconstructed by a decoded image output from the lossless decompression unit 230 and the lossy decompression unit and the decoded image may be stored in a memory 250.

The decompression unit selector 220 may use a demultiplexer (not depicted) that receives a signal and transmits the signal through one of two output terminals. Although one of the first code CODE 1 and the second code CODE 2 is input to the decompression unit selector 220 in FIG. 8, at least two codes as in FIG. 6 may be input to the decompression unit selector 220, thereby normally decoding a code compressed at multi-level compression rates.

Figure 9:
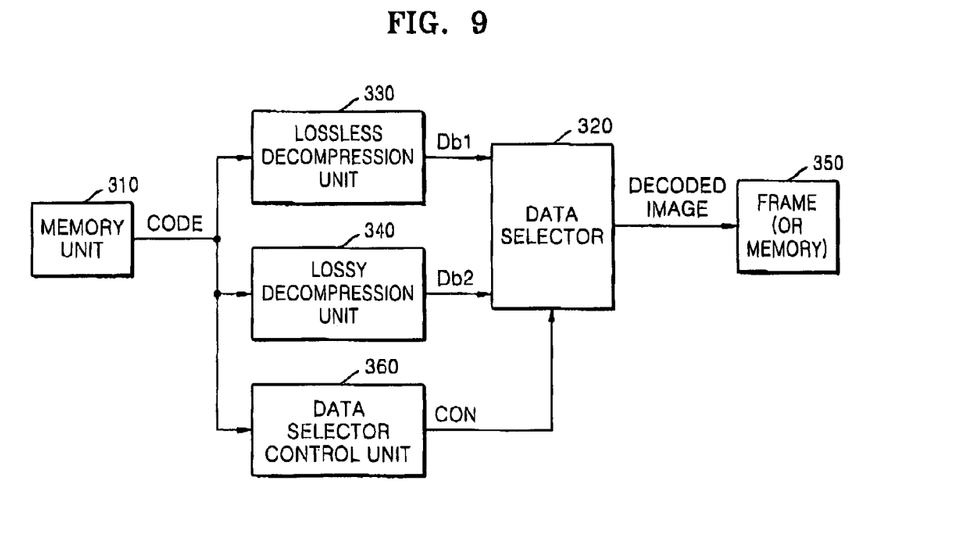
FIG. 9 is a block diagram of an image data reconstruction system according to example embodiment of the present invention.

FIG. 9 is a block diagram of an image data reconstruction system according to an example embodiment of the present invention. Components in FIG. 9 corresponding to those in FIG. 8 will not be described in detail.

Referring to FIG. 9, the image data reconstruction system includes a lossless decompression unit 330 and a lossy decompression unit 340. The lossless decompression unit 330 receives a code generated through compression of a frame (e.g., represented as a plurality of blocks) from a memory unit 310, performs lossless decompression on the received code, and outputs first image data Db1. The lossy decompression unit 340 performs lossy decompression on the received code and outputs second image data Db2.

The image data reconstruction system further includes a data selector 320 that receives the first image data Db1 and the second image data Db2 from the lossless decompression unit 330 and the lossy decompression unit 340 and outputs one of them. A frame 350 is reconstructed by a decoded image output from the data selector 320 and the decoded image may be stored in a memory 350.

When the code input from the memory unit 310 is generated through lossless compression, the data selector 320 outputs the first image data Db1. When the code input from the memory unit 310 is generated through lossy compression, the data selector 320 outputs the second image data Db2. In other words, the data is generated through lossless compression or lossy compression, and one of the first image data Db1 and the second image data Db2 is normally decompressed, but the other fails to be decompressed or has an error in decompression. The data selector 320 outputs image data that is normally decompressed.

Alternatively, for operation of the data selector 320, the image data reconstruction system further can include an optional data selector control unit 360. The data selector control unit 360 outputs a selection control signal CON for controlling the data selector 320 using compression information included in the code. For example, the data selector control unit 360 determines whether the code is generated through lossless compression or lossy compression using a flag bit included in the code and outputs the selection control signal to the data selector 320.

Figure 10:
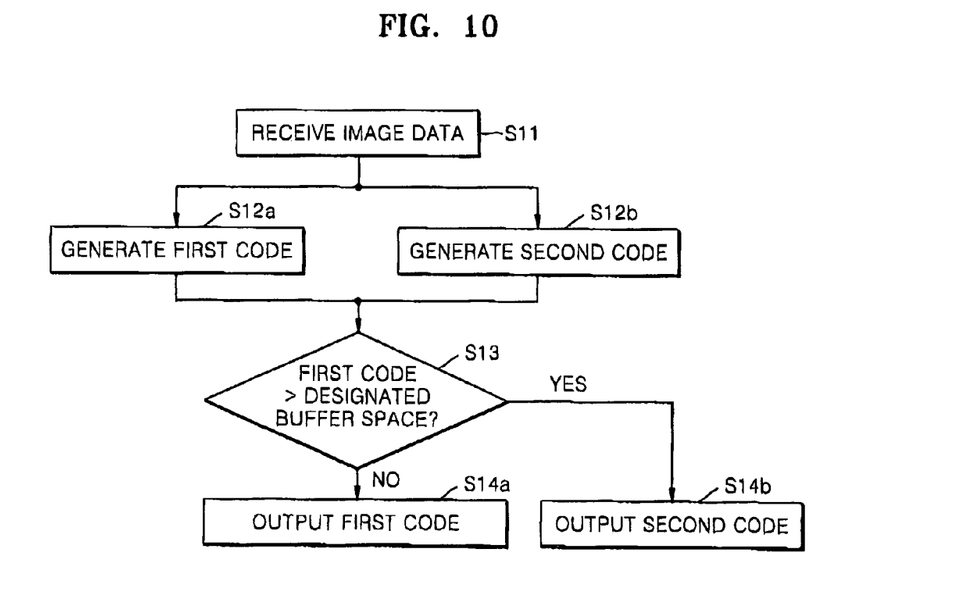
FIG. 10 is a flowchart illustrating an image data compression method according to an example embodiment of the present invention.

FIG. 10 is a flowchart illustrating an image data compression method according to an example embodiment of the present invention.

As illustrated in FIG. 10, the image data compression method compresses a frame that includes a plurality of blocks. Once image data is input in units of a block in operation S11, the image data is lossless-compressed to generate a first code in operation S12a and the image data is lossy-compressed to generate a second code in operation S12b. Operations S12a and S12b may be performed at the same time.

The size of the generated first code and the size of a designated buffer space for storing the first code are compared in operation S13. When the size of the first code is less than or equal to the size of the designated buffer space, the first code is output in operation S14a. The output first code is stored in the designated buffer space of a memory unit.

If the size of the first code exceeds the size of the designated buffer space, the second code is output in operation S14b. Accordingly, the output second code is stored in a designated buffer space of the memory unit.

In operations S12a and S12b, flag bits indicating compression information of the image data can be included in the first code and the second code. Thus, decoding can be performed according to compression types of the first code and the second code.

Figure 11:
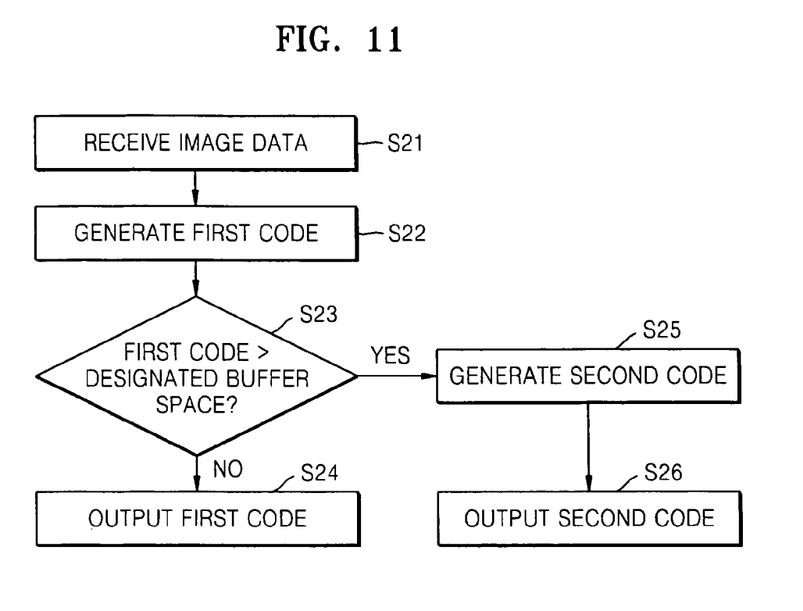
FIG. 11 is a flowchart illustrating an image data compression method according to an example embodiment of the present invention.

FIG. 11 is a flowchart illustrating an image data compression method according to an example embodiment of the present invention.

As illustrated in FIG. 11, once image data is input in units of a block in operation S21, the image data is lossless-compressed to generate a first code in operation S22. The size of the generated first code and the size of a designated buffer space for storing the first code are compared in operation S23. When the size of the first code is less than or equal to the size of the designated buffer space, the generated first code is output in operation S24. The output first code is stored in the designated buffer space of a memory unit.

In operation S23, when the size of the first code exceeds the size of the designated buffer space, the image data is lossy-compressed to generate a second code in operation S25. In this case, the generated first code is not output to the designated buffer space, and may be removed. Instead, the generated second code is output and stored in the designated buffer space of the memory unit in operation S26.

Figure 12:
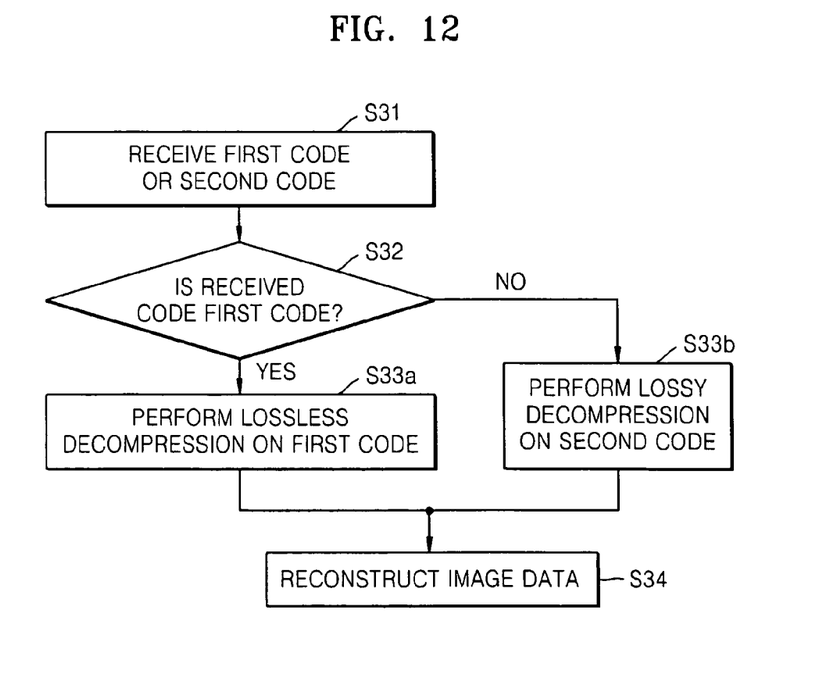
FIG. 12 is a flowchart illustrating an image data reconstruction method according to an example embodiment of the present invention.

FIG. 12 is a flowchart illustrating an image data reconstruction method according to an example embodiment of the present invention.

As illustrated in FIG. 12, to reconstruct a frame compressed in units of a block, one of a first code and a second code read from a memory is input in operation S31. The first code is generated through lossless compression of a block of the frame and the second code is generated through lossy compression of the block.

It is determined whether an input code is the first code or the second code in operation S32. The determination can be made using a flag bit included in the input code.

If the input code is the first code, then the first code is lossless-decompressed in operation S33a. If the input code is the second code, then the second code is lossy-decompressed in operation S33b. In this way, by appropriate selection of lossless-decompression or lossy-decompression, image data can be reconstructed in operation S34. A lossless decompression unit and a lossy decompression unit may be included for lossless decompression or lossy decompression of the code. Decompression of a lossless-compressed code and decompression of a lossy-compressed code may be performed through separate data paths.

As described above, according to one or more embodiments of the present invention, lossless compression and lossy compression can be selectively applied on an adaptive basis, e.g., a block-by-block basis, to compress a frame (e.g., represented as a plurality of blocks) according to the size of the respective resulting compressed code, thereby efficiently compressing image data without virtual degradation in image quality.

While the present invention has been particularly shown and described with reference to example embodiments thereof, it will be understood by those of ordinary skill in the art that various changes in form and details may be made therein without departing from the spirit and scope of the present invention as defined by the following claims.

What is claimed is:

1. An image data compression system for compressing a frame represented as a plurality of blocks, the image data compression system comprising:
   a lossless compression unit configured to receive the plurality of blocks and to perform lossless compression thereon resulting in a first code;
   a lossy compression unit configured to receive the plurality of blocks and to perform lossy compression thereon resulting in a second code;
   a code selection circuit configured to contemporaneously receive the first and second codes and configured to selectively output one of the first and second codes based upon an output size evaluated for at least one of the first and second codes; and
   a memory unit configured to receive at least one of the first and second codes output from the code selection circuit, the memory unit including a plurality of designated buffer spaces for storing compressed codes of the plurality of blocks, each designated buffer space corresponding to one of the plurality of blocks, wherein
   a size of each designated buffer space has a fixed value, and a size of the second code output from the lossy compression unit is less than a size of a corresponding designated buffer space,
   the code selection circuit includes information regarding the size of the designated buffer spaces and the code selection circuit compares the size of the first code output from the lossless compression unit with the size of the corresponding designated buffer space,
   the lossless compression unit is further operable to output size indicative information regarding the first code; and
   the code selection circuit includes
      a code selector configured to select one of the first and second code signals according to a control signal, and
      a selector control unit configured to receive the size indicative information and to compare the size indicative information against the size of the designated buffer space, and to accordingly generate the control signal to control the code selector for selection of the first code when the size of the first code is less than or equal to the size of the designated buffer space and for selection of the second code when the size of the first code exceeds the size of the designated buffer space.

2. The image data compression system of claim 1, wherein at least one of the first code and the second code includes a flag bit for indicating lossless compression or lossy compression.

3. The image data compression system of claim 1, wherein the selector is a multiplexer.

4. The image data compression system of claim 1, wherein the code selector control unit comprises:
   a comparison unit configured to receive the size indicative information regarding the first code, to compare the size of the first code and the size of the designated buffer space, and to output a comparison signal; and
   a selection control signal generation unit configured to receive the comparison signal and to generate the control signal.

5. The image data compression system of claim 1, wherein the image data is contemporaneously received by the lossless compression unit and the lossy compression unit.

6. The image data compression system of claim 1, wherein each of the plurality of designated buffer spaces has size corresponding to each block of the frame, and a code stored in each of the plurality of designated buffer spaces has a size equal to or less than the value of size of the corresponding designated buffer space.

7. An image data compression system for compressing a frame represented as a plurality of blocks, the image data compression system comprising:
   a lossless compression unit configured to receive the plurality of blocks and to perform lossless compression thereon resulting in a first code;
   a lossy compression unit, including a plurality of lossy compressors that perform different types of compression, configured to receive the plurality of blocks and to perform lossy respective compression thereon resulting in a plurality of respective lossy-compressed codes;
   a code selection circuit configured to contemporaneously receive the first and second codes and configured to selectively output one of the first code or one among the plurality of lossy-compressed codes based upon output sizes evaluated for the first code and for at least one among the plurality of lossy-compressed codes, respectively; and a memory unit configured to receive the first code or one among the plurality of lossy-compressed codes output from the code selection circuit, the memory unit including designated buffer spaces for storing the output compressed codes of the plurality of blocks, and each designated buffer space corresponding to one of the plurality of blocks, wherein a size of each designated buffer space has a fixed value, and a size of at least one of the lossy-compressed codes output from the lossy compression unit is less than the size of a corresponding designated buffer space, the code selection circuit includes information regarding the size of the designated buffer spaces and the code selection circuit compares the size of the first code output from the lossless compression unit with the size of the corresponding designated buffer space, the lossless compression unit is further operable to output size indicative information regarding the first code; and the code selection circuit includes a code selector configured to select one of the first and second code signals according to a control signal, and a selector control unit configured to receive the size indicative information and to compare the size indicative information against the size of a designated buffer space, and to accordingly generate the control signal to control the code selector for selection of the first code when the size of the first code is less than or equal to the size of the designated buffer space and for selection of the second code when the size of the first code exceeds the size of the designated buffer space.

8. The image data compression system of claim 7, wherein the lossy compression unit comprises:

a first lossy compressor configured to output a second code generated through a first type of lossy compression of the image data; and a second lossy compressor configured to output a third code generated through a second type of lossy compression different from the first type.

9. The image data compression system of claim 8, wherein:

each of the lossless compression unit and the first lossy compressor is further operable to output size indicative information regarding the first and second codes, respectively;

the first and second lossy compressors are further operable to output loss-rate indicative information regarding the second and third codes, respectively; and the code selector unit further configured to select one of the first, second and third codes according to the control signal, and the selector control unit further configured to receive the respective indicative information and to generate the control signal so as to cause the code selector to select the first code when the size of the first code is less than or equal to the size of the designated buffer space, the third code when the sizes of the first and the second codes exceed the size of the designated buffer space, and one of the second code and the third code having the smaller loss rate when the size of the first code exceeds the size of the designated buffer space and when the size of the second code is less than or equal to the size of the designated buffer space.

10. The image data compression system of claim 9, wherein at least one of the first through third codes includes a flag bit for indicating lossless compression or lossy compression.

11. The image data compression system of claim 9, wherein the code selector is a multiplexer.

12. The image data compression system of claim 9, wherein the code selector control unit comprises:

a first comparison unit configured to receive first code information indicative of the size of the first code, to compare the size of the first code and the size of the designated buffer space, and to output a first comparison signal;

a second comparison unit configured to receive second code information indicative of the loss rate of the third code, to compare the size of the second code and the size of the designated buffer space, and to output a second comparison signal;

a loss rate comparison unit configured to receive the loss-rate indicative information regarding the second and third codes, to compare the loss rate of the second code and the loss rate of the third code, and to output a loss rate comparison signal; and a selection control signal generation unit configured to generate a selection control signal for controlling the code selector according to the loss rate comparison signal.

13. The image data compression system of claim 9, wherein the image data is contemporaneously input to the lossless compression unit and the lossy compression unit.

14. The image data compression system of claim 7, wherein each of the plurality of designated buffer spaces has size corresponding to each block of the frame, and a code stored in each of the plurality of designated buffer spaces has a size equal to or less than the value of size of the corresponding designated buffer space.

15. An image data compression method for compressing a frame represented as a plurality of blocks, the image data compression method comprising:

performing lossless compression on the blocks to generate a first code;

outputting size indicative information regarding the first code;

performing lossy compression on the blocks to generate a second code;

obtaining an output size for the first code;

contemporaneously receiving the first and second codes and selecting one of the first code and the second code according to the output size;

selecting, by a code selector, one of the first and second code according to a control signal;

receiving, by a selector control unit, the size indicative information;

comparing, by the selector control unit, the size indicative information against the size of a designated buffer space and accordingly generating, by the selector control unit, the control signal to control the code selector for selection of the first code when the size of the first code is less than or equal to the size of the designated buffer space and for selection of the second code when the size of the first code exceeds the size of the designated buffer space;

storing the selected code in a memory unit, wherein the memory unit includes designated buffer spaces for storing compressed codes of the plurality of blocks, and each designated buffer space corresponds to one of the plurality of blocks, a size of each designated buffer space having a fixed value, and a size of the second code being less than a size of a corresponding designated buffer space, and selecting one of the first code and the second code includes selecting information regarding the size of the designated buffer spaces and comparing the size of the first code with the size of the corresponding designated buffer space.

16. The image data compression method of claim 15, wherein the generation of the first code and the generation of the second code are performed contemporaneously.

17. The image data compression method of claim 15, wherein the generation of at least one of the first code and second code includes generating a flag bit indicating compression information of the respective code.

18. The image data compression method of claim 15, wherein the figure of merit is the size of the first code, and the method further comprises:
comparing the size of the first code generated through lossless compression of the image data and the size of a designated buffer space for storing the first code; and
outputting one of the first code and the second code according to a comparison result,
wherein the first code is output when the size of the first code is less than or equal to the size of the designated buffer space and the second code is output when the size of the first code exceeds the size of the designated buffer space.

19. The image data compression method of claim 15, wherein each of the plurality of designated buffer spaces has size corresponding to each block of the frame, and a code stored in each of the plurality of designated buffer spaces has a size equal to or less than the value of size of the corresponding designated buffer space.

20. An image data compression method for compressing a frame represented as a plurality of blocks, the image data compression method comprising:
performing lossless compression on the blocks to generate a first code;
outputting size indicative information regarding the first code;
performing lossy compression on the blocks to generate a second code;
contemporaneously receiving the first and second codes;
comparing an output size of the first code and a size of a designated buffer space for storing the first code in a memory;
storing the first code when the output size of the first code is less than or equal to the size of a corresponding designated buffer space in the memory; and
storing the second code in the memory, when the output size of the first code exceeds the size of the designated buffer space;
selecting, by a code selector, one of the first and second code according to a control signal;
receiving, by a selector control unit, the size indicative information;
comparing, by the selector control unit, the size indicative information against the size of a designated buffer space and accordingly generating, by the selector control unit, the control signal to control the code selector for selection of the first code when the size of the first code is less than or equal to the size of the designated buffer space and for selection of the second code when the size of the first code exceeds the size of the designated buffer space, wherein
the memory includes designated buffer spaces for storing compressed codes of the plurality of blocks, and each of the designated buffer spaces corresponds to one of the plurality of blocks, and
a size of each designated buffer space has a fixed value, and an output size of the second code is always less than a size of a corresponding designated buffer space.

21. The image data compression method of claim 20, wherein the generation of at least one of the first code and the second code includes generating a flag bit indicating compression information of respective code.

22. The image data compression method of claim 20, wherein each of the plurality of designated buffer spaces has size corresponding to each block of the frame, and a code stored in each of the plurality of designated buffer spaces has a size equal to or less than the value of size of the corresponding designated buffer space.

23. An image data reconstruction method for reconstructing a frame represented as a plurality of blocks, the image data reconstruction method comprising:
receiving one of a first code generated through lossless compression of a given block of the frame and a second code generated through lossy compression of the given block of the frame;
storing the received code to a memory, the memory including designated buffer spaces for storing the received compressed codes of the plurality of blocks, a size of each of the designated buffer spaces having a fixed value, and a size of the received first or second code being less than the fixed value of the corresponding designated buffer space,
determining whether the received code is the first code or the second code;
generating a control signal based on the determination;
selectively outputting the identified first or second code correspondingly to one of a lossless decompression unit and a lossy decompression unit based on the control signal; and
performing lossless decompression on the first code if the received code is the first code and performing lossy decompression on the second code if the received code is the second code.

24. The image data reconstruction method of claim 23, wherein the determination of whether the received code is the first code or the second code includes identifying the received code as the first code or the second code using a flag bit included in the received code.

25. The image data reconstruction method of claim 23, wherein decompression of a lossless-compressed code and decompression of a lossy-compressed code are performed through separate data paths.

26. An image data reconstruction system for reconstructing a frame represented as a plurality of compressed blocks, the image data reconstruction system comprising:
a lossless decompression unit configured to receive a first code generated through lossless compression of the blocks and to decompress the first code;
a lossy decompression unit configured to receive a second code generated through lossy compression of the blocks and to decompress the second code;
a memory configured to include designated buffer spaces for storing the first and second codes of the plurality of compressed blocks, the size of each of the designated buffer spaces having a fixed value, and a size of a received first or second code being less than the fixed value of the corresponding designated buffer space, a decompression unit selector connected to the memory and configured to receive a compressed code, identify the received compressed code as one of the first code and the second code based on a selection control signal, and output the identified first or second code correspondingly to one of the lossless decompression unit and the lossy decompression unit;

a decompression unit selector control unit configured to determine whether the received code is generated through lossless compression or lossy compression and to accordingly generate the selection control signal to the decompression unit selector.

27. The image data reconstruction system of claim 26, wherein the received code includes a flag bit for determining whether the received code is generated through lossless compression or lossy compression.

28. The image data reconstruction system of claim 26, wherein the decompression unit selector is a demultiplexer.

29. An image data reconstruction system for reconstructing a frame represented as a plurality of compressed blocks, the image data reconstruction system comprising:

a lossless decompression unit configured to receive a code generated through compression of the blocks, to perform lossless-decompression on the received code, and to output first video data;

a lossy decompression unit configured to receive a code generated through compression of the blocks, to perform lossy-decompression on the received code, and to output second video data;

a memory configured to include designated buffer spaces for storing the first and second video data of the plurality of compressed blocks, a size of each designated buffer space having a fixed value, and a size of the received first or second video data being less than the fixed value of the corresponding designated buffer space;

a data selector configured to receive the first video data and the second video data, identify the received video data as one of the first video data and the second video data, and to selectively output one of the first video data and the second video data according to a control signal; and a selector control unit configured to receive respective information about the code received by the lossless decompression unit and the lossy decompression unit, to determine whether the received code is generated through lossless compression or lossy compression, and to generate the control signal according to the received information.

* * * * *